(12) United States Patent
Higashino

(10) Patent No.: US 6,350,976 B1
(45) Date of Patent: Feb. 26, 2002

(54) DISTANCE MEASURING APPARATUS

(75) Inventor: Fuminobu Higashino, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,180

(22) Filed: Sep. 27, 1999

(30) Foreign Application Priority Data

Sep. 28, 1998 (JP) .......................................... 10-273771
Jun. 8, 1999 (JP) .......................................... 11-160845

(51) Int. Cl.⁷ ............................................ G03B 13/20
(52) U.S. Cl. ............................. 250/201.4; 250/201.8; 396/89
(58) Field of Search ........................... 250/201.2, 201.4, 250/201.7, 201.8, 201.6, 208.1, 226; 396/89, 93, 98, 101, 104, 106, 121, 123, 131

(56) References Cited

U.S. PATENT DOCUMENTS

| | | | |
|---|---|---|---|
| 4,835,561 A | * 5/1989 | Matsui | .................... 396/93 |
| 4,843,227 A | * 6/1989 | Matsui et al. | ............ 250/201.2 |
| 4,992,817 A | 2/1991 | Aoyama et al. | |
| 5,081,344 A | * 1/1992 | Misawa | ................ 250/201.21 |
| 5,121,153 A | 6/1992 | Yamada et al. | |
| 5,245,175 A | * 9/1993 | Inabata | .................... 250/201.8 |
| 5,315,342 A | 5/1994 | Cocca | |
| 5,589,910 A | 12/1996 | Saito et al. | |
| 5,784,654 A | 7/1998 | Saito et al. | |
| 5,870,178 A | 2/1999 | Egawa et al. | |
| 6,243,537 B1 | * 6/2001 | Higashino | .................... 396/98 |

FOREIGN PATENT DOCUMENTS

| | | |
|---|---|---|
| EP | 0437924 | 7/1991 |
| EP | 0437966 | 7/1991 |
| JP | 10243281 | 9/1998 |
| WO | 94/15252 | 7/1994 |

* cited by examiner

Primary Examiner—John R. Lee
(74) Attorney, Agent, or Firm—Greenblum & Bernstein, P.L.C.

(57) ABSTRACT

Disclosed is a distance measuring apparatus for measuring the distance to an object. The apparatus has a line of charge couple device (CCD) elements which are operated as two sensors (PSA, PSB) for passive sensing and one sensor (AS) in combination with a light emitting element (40) for active sensing. An infrared light cut-off filter (33) is provided on the light receiving surface of all the elements while a visible light cut-off filter (34) is overlaid the light receiving surface of the elements corresponding to the active sensor. An optical system (20) is located to form an image of the object on the sensors. A control circuit (50) initially operates the passive sensors during passive sensing and then operates the active sensor during active sensing. The provision of both passive and active sensing in one apparatus enables miniaturization, a decrease in weight, and cost-savings.

18 Claims, 7 Drawing Sheets

DISTANCE MEASURING APPARATUS

BACKGROUND OF THE INVENTION

The present invention relates to a distance measuring apparatus for use with cameras, video cameras, and the like for measuring the distance to an object.

One technique for the measurement of the distance to an object, the passive method, uses two light receiving sensors having the same optical system. These detect the contrast of an object in order to determine the distance in accordance with a shift in position caused by the parallax of the object as projected on each light receiving sensor. The passive method utilizes ambient light. Thus, it is possible to perform accurate distance measurement if the object is bright enough for the light receiving sensor to detect the object. However, the accuracy decreases when the object does not provide sufficient contrast or is dark.

Another technique for the measurement of the distance to an object, the active method, uses light emitted from a light projecting element towards the object, which is then reflected by the object and detected by means of light receiving elements. The position of the spectral center of the light reflected from the object is used to determine the distance by the triangulation method. With the active method, while distance measurement is possible when the object is dark, has no contrast, or has repeated patterns which reflect light, it is difficult to provide highly accurate range finding for an object located at a relatively large distance away due to a decrease in the quantity of light reflected from the object.

Prior art cameras have used either the passive or active methods for object distance measuring in cameras. As mentioned above, the passive and active distance measuring methods have advantages and disadvantages. Thus, a distance measuring apparatus which could implement both passive and active methods would be desirable in cameras so that highly accurate distance measuring could be obtained in response to various photo taking conditions.

With the active method, since reflected light, derived from a source of light, is detected for performing distance measurement, infrared light is used as the source of light. In this way, the light receiving elements can distinguish that light from ambient light. Thus, the active method allows for distinguishing the reflected light from ambient light or visible light. Consequently, the active method must necessarily use light receiving elements sensitive to infrared light. Thus, optical sensors formed in a line have normally been used as position sensing devices (PSDs).

With the passive method, since the contrast of an object is used for performing distance measurement, light receiving elements are used which are capable of outputting a light and dark contrast as a current value or voltage value, for example charge coupled devices (CCDs).

For this reason, it is necessary to have PSD and CCD light receiving elements, respectively, to facilitate the use of both active and passive methods. Moreover, it is also necessary to have additional optical systems associated with each method, which produces a more complex and larger constitution for the distance measuring apparatus. It is therefore difficult to provide a small and light-weight camera with such a distance measuring apparatus.

It is possible to envisage distance measuring based on both active and passive methods and which uses one of PSD or CCD sensors. However, the passive method will hardly function with PSDs since it is difficult to detect the contrast of the object while, due to the low sensitivity to infrared light of CCDs, it is difficult for CCDs to detect the reflected infrared light radiated from a source of light.

Thus, with the prior art, it has been found that in order to produce a distance measuring apparatus utilizing both methods and their consequent advantages, it has been necessary to constitute individual apparatus. For this reason, the constitution of the distance measuring apparatus has not been significantly simplified.

There is therefore a problem that the distance measuring apparatus can not be miniaturized, can not be reduced in weight, and can not provide any cost savings. Such apparatus can consequently not be applied to compact cameras. In this respect, since such cameras are typically equipped with automatic focusing (AF) devices, the mechanism of which occupies a large proportion of the volume and weight, incorporating a distance measuring apparatus with both methods into this type of camera is not beneficial in terms of improving miniaturization and weight reduction.

SUMMARY OF THE INVENTION

It is therefore an object of the present invention to provide a distance measuring apparatus using both the passive method and active method which is applicable to compact cameras.

According to the present invention there is provided a distance measuring apparatus which includes: at least three light-receiving sensors comprising CCD elements, an optical system for allowing the each light-receiving sensor to form the image of an object individually, a light-emitting element for radiating light to the object, a passive range finder comprising two light-receiving sensors as passive sensors among the light-receiving sensors, and the optical system, and an active range finder constituted by using the remaining one light-receiving sensor which is adopted as an active sensor, the optical system, and the light-emitting element.

In a particular embodiment, the present invention is constituted in a manner such that an infrared light cut-off filter is arranged on the light-receiving surfaces of the three light-receiving sensors and a visible light cut-off filter is arranged on the light-receiving surface of the active sensor, and the light-emitting element emits light of a range of wavelengths between the visible light region and infrared light region.

Conveniently, each passive and active sensor is preferably constituted as a line sensor having a number of CCD elements arranged in a line. In addition, the center of the line sensor in the longitudinal direction is preferably constituted as the active sensor, and both ends of the line sensor in the longitudinal direction are preferably constituted as the passive sensors.

Alternatively, the each sensor may be constituted by individually independent CCD elements for independent or synchronous drive control. Furthermore, the optical system may comprise passive lenses for forming the image of an object corresponding to the passive sensors, an active lens for forming the image of an object corresponding to the active sensor, and a condenser lens for condenser light emitted by the light-emitting element toward the object. Each lens may be preferably formed as one body.

The present invention provides that each sensor receives light of different wavelengths while the light emitting element is selected to emit light of an appropriate wavelength, whereby either one of the passive and active methods is available for distance measurement according to photo taking circumstances in spite of the sensors being constituted by CCD elements.

Thus, a need to have both PSD and CCD sensors is avoided so that the distance measuring apparatus can be simplified making it possible to realize miniaturization, a decrease in weight, and cost savings for distance measuring apparatus and cameras. Furthermore, use of the passive method is placed at a higher priority to provide distance measuring data under normal conditions, and, when reliable distance measuring data is not available by means of the passive method, the active method is performed to provide distance measuring data if the brightness of, the ambient light is less than a predetermined level. For this reason, reliable distance measuring data is available under various photo taking conditions.

DETAILED DESCRIPTION OF THE PREFERRED EMBODIMENTS

Figure 1:
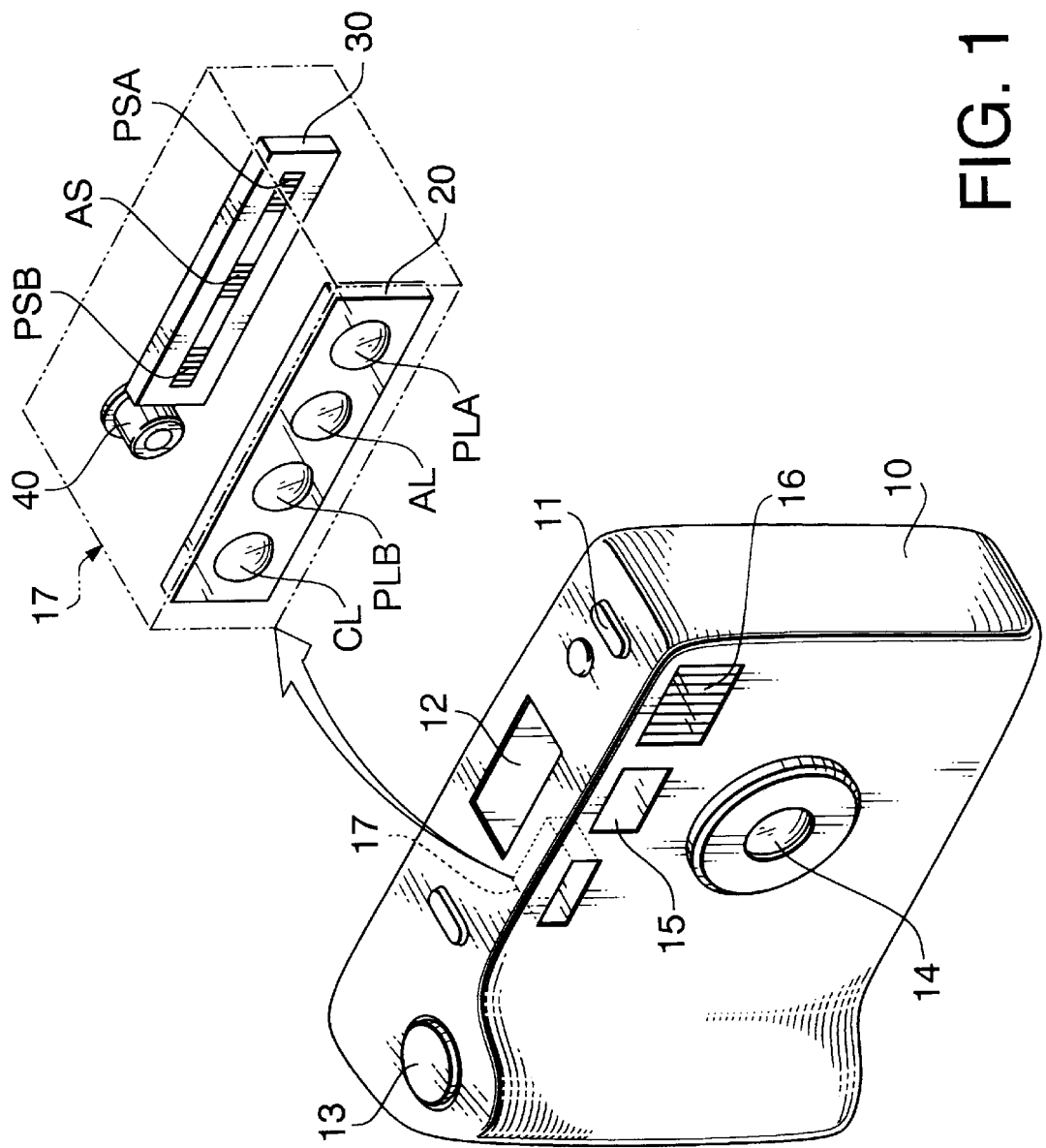
FIG. 1 illustrates a perspective view of a camera to which a distance measuring apparatus of an embodiment of the present invention is applied.

Referring to FIG. 1, a compact camera is provided with a camera body having a multi-function switch 11, an LCD display portion 12, and a release button 13 on the upper surface thereof.

The front of the camera has a photo-taking lens 14 therein. In addition, there is provided a viewfinder window 15, a strobe.16, and a distance measuring apparatus 17 embodying the present invention. The distance measuring apparatus is intended to measure the distance of an object to be photographed from the camera.

The distance measuring apparatus, which is provided at the side of the viewfinder window 15, has an optical system comprising a plurality of lenses formed as one compound lens 20, a line sensor 30 on which images of the object are formed, and a light emitting diode (LED) 40 which radiates the object with light.

Figure 2:
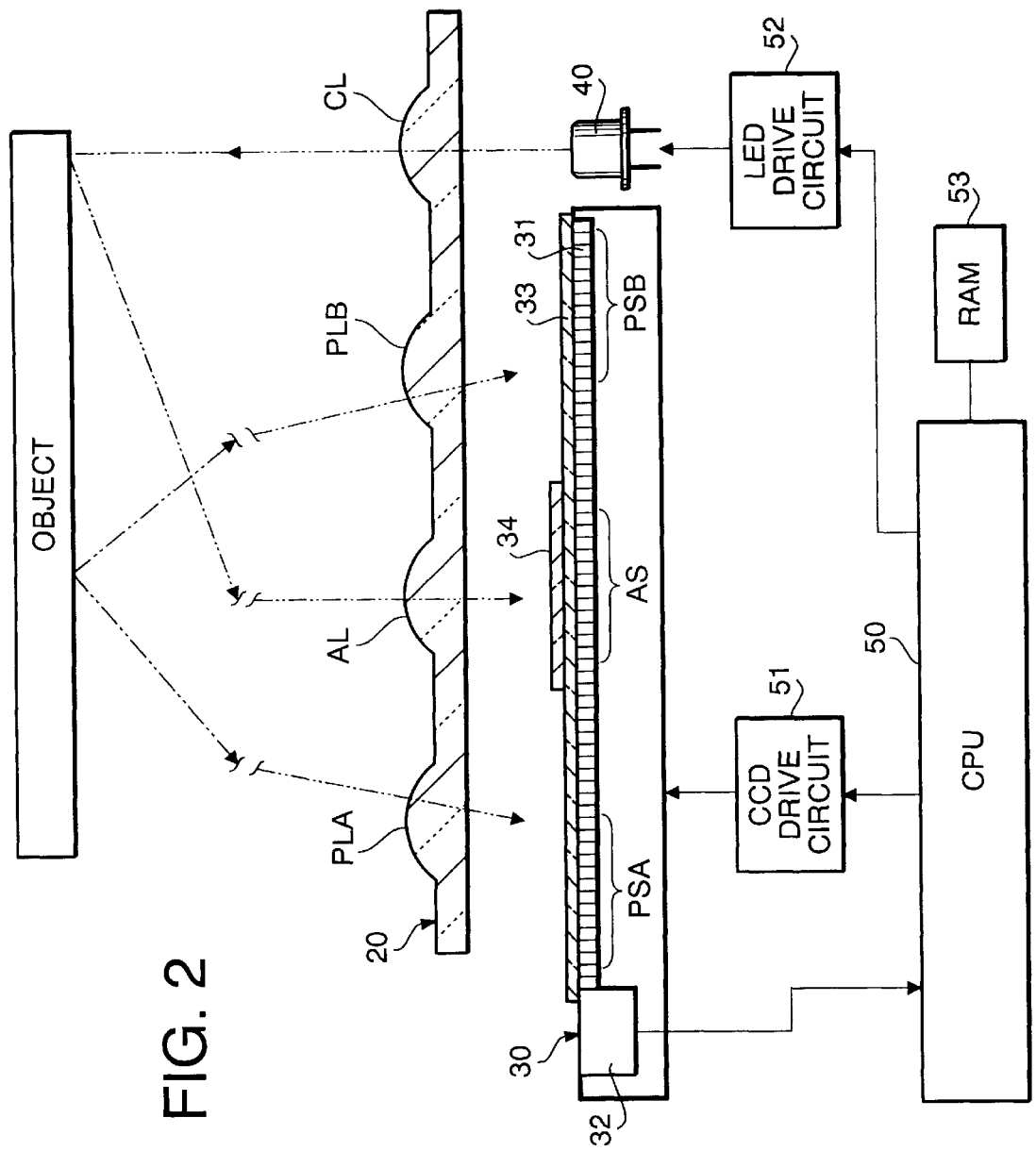
FIG. 2 illustrates a plan view showing the configuration of the distance measuring apparatus used in the camera of FIG. 1.

Referring to FIG. 2, the line sensor 30 has a light receiving portion 31 comprising a plurality of CCD elements arranged in a straight line. Light incident on the light receiving portion 31 is photo-electrically converted by the elements into an electric charge which is then accumulated therein. This accumulated electric charge is then transferred in a controlled manner along the line to be output as a voltage signal from an output portion 32 provided at one end of the line. Thus, the line sensor 30 can detect the intensity of the light received at the light receiving portion 31.

In the present embodiment, the light receiving portion 31 is divided into three regions which do not overlap one another. The regions at either end of the line are constituted as passive sensors PSA and PSB, and with the central region constituted as an active sensor AS. An infrared light cut-off filter 33 for cutting out infrared light is provided on the light receiving surface of the line sensor to span across the aforementioned three regions. In addition, a visible light cut-off filter 34 for cutting out visible light is overlaid on the light receiving surface at the region of the active sensor AS.

The LED 40 is selected to emit light of a wavelength within the region of spectral sensitivity of the CCD elements comprising the line sensor 30, and also close to the infrared light region rather than to the visible light.

Figure 3:
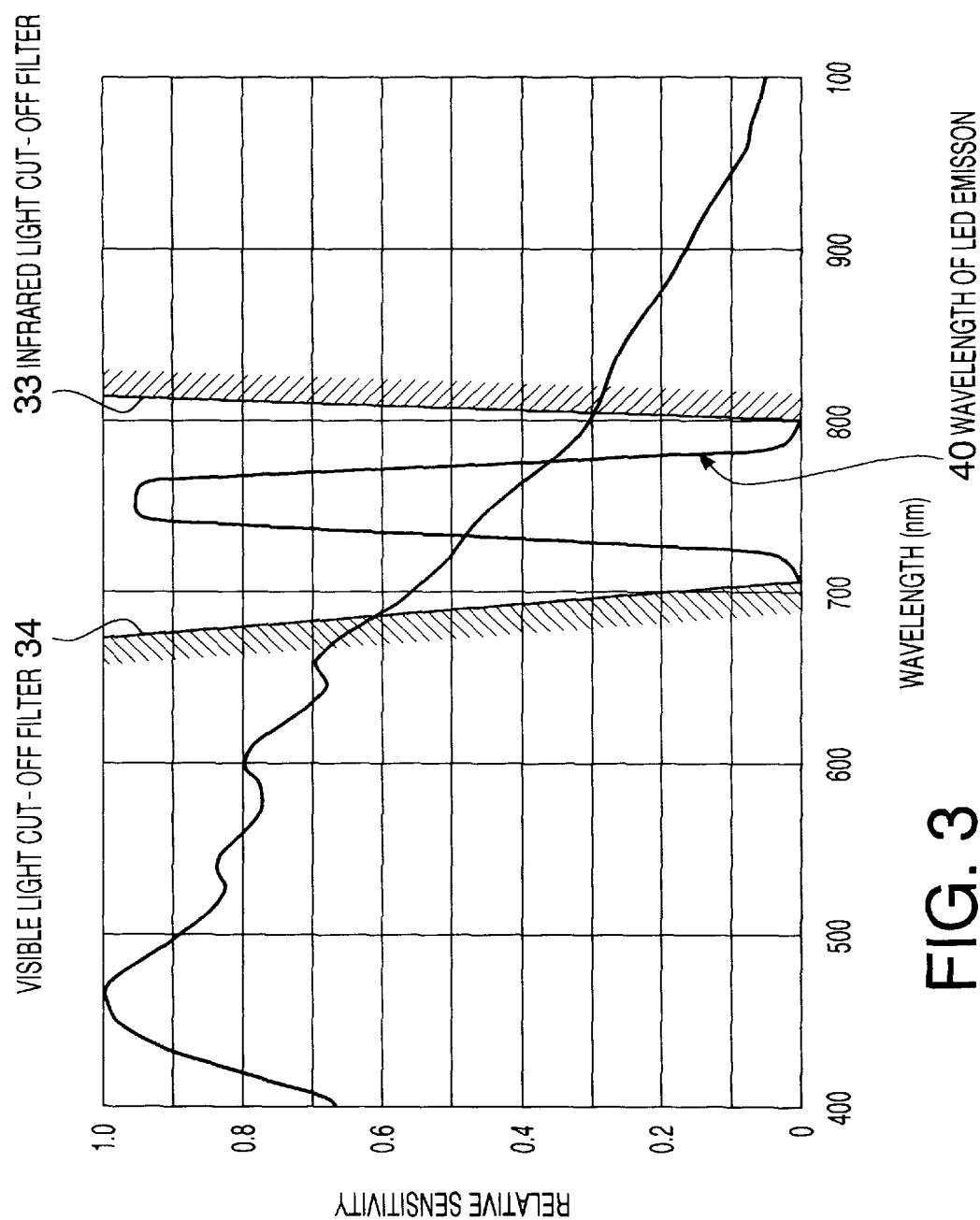
FIG. 3 shows a graph of the spectral sensitivity characteristics of parts of the distance measuring apparatus used in the camera of FIG. 1.

FIG. 3 shows an example of a plot of the spectral sensitivity characteristics of the CCD element together with the cut-off characteristics of the cut-off filters 33 and 34. The LED 40 is therefore selected to emit light of a wavelength longer than the cut-off wavelength of 700 nm of the filter 34 and shorter than the wavelength 800 nm of the filter 33. For example, the wavelength may be approximately 750 nm.

The compound lens 20 has two passive lenses PLA and PLB which are located to face the passive sensors PSA and PSB, one active lens AL which is located to face the active sensor AS, and a condenser lens CL which is located on the optical axis of the LED 40. Each of the passive and active lenses PLA, PLB, AL, and the condenser lens CL are arranged horizontally at predetermined intervals and formed as one body. The compound lens 20 may be formed as one body from, for example, transparent resin.

The line sensor 30 is connected to a CPU 50 and a CCD drive circuit 51. According to drive signals from the drive circuit, an output signal from the output portion 32 is inputted to the CPU 50. The LED 40 is also connected to the CPU 50 via an LED drive circuit 52. As described below, the CPU 50 selects either the passive or active method as the appropriate operation for distance measurement for the camera. Thus, the CPU 50 actuates the LED 40 to emit light at predetermined intervals in an active method operation while inhibiting the LED 40 to emit light in a passive method operation except in special cases.

In each operation, the output from the line sensor 30 is captured and a calculation of the distance to an object is performed. The CPU 50 is also connected with a RAM 53 for storing various kinds of data required for distance measurement calculation.

The distance measurement by the above described apparatus will now be explained below.

Figure 4:
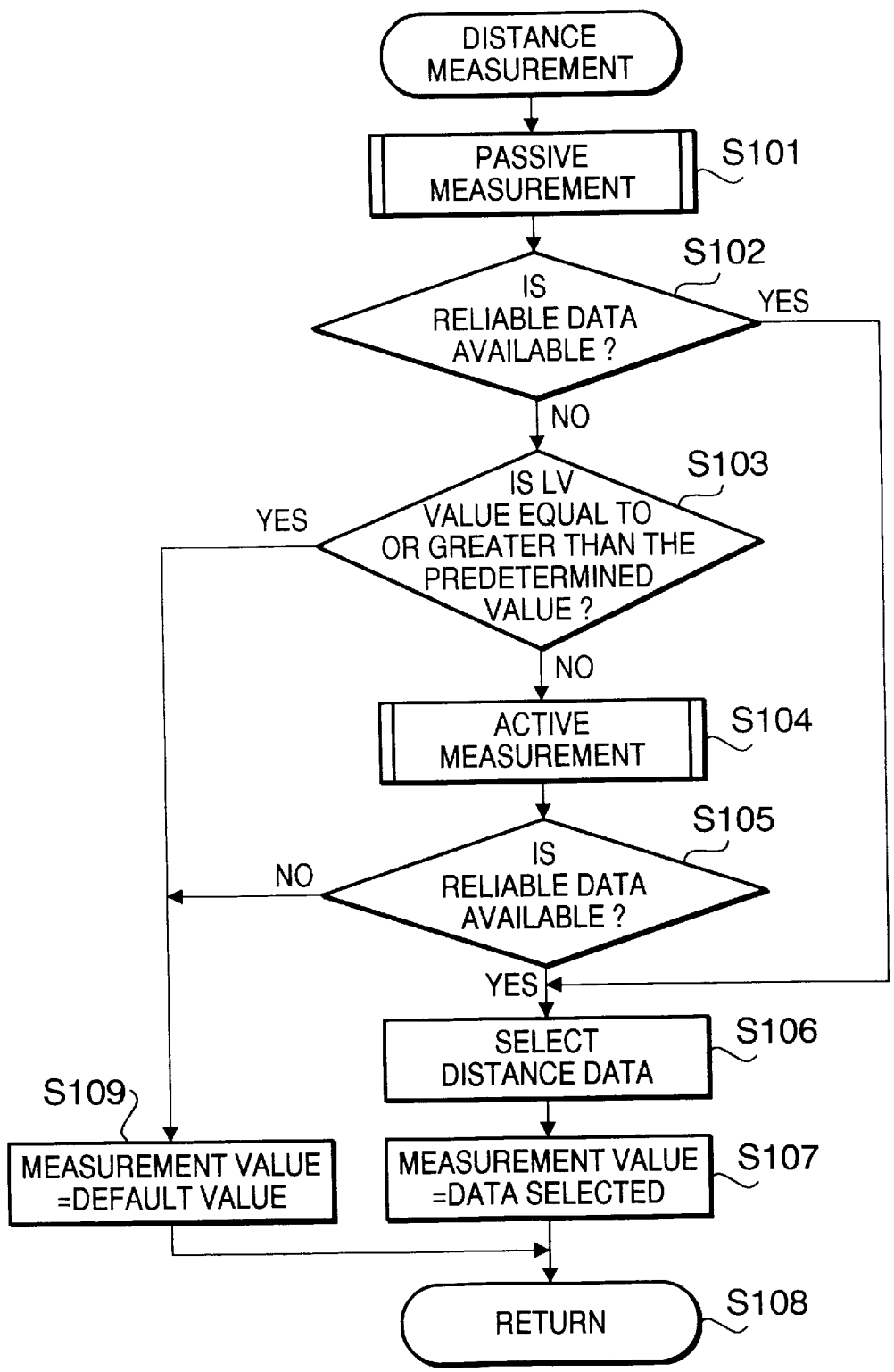
FIG. 4 is a flowchart showing the operation of the distance measuring apparatus used in the camera of FIG. 1.

FIG. 4 is a flowchart that shows a distance measurement operation. First, a distance measurement command is input to the CPU 50 from the camera side which causes the CPU 50 to execute the passive method operation (S101). In this passive method operation, the CPU 50 outputs an integration start command to the CCD drive circuit 51.

As a consequence, the line sensor 30 starts integration and then ends the integration on receipt of an accumulation end command from the drive circuit 51. Subsequently, the electric charge accumulated in the light-receiving portion 31 is transferred to the output portion 32 in synchronization with a clock signal and outputted therefrom as data in the form of A/D converted current or voltage. The data is stored in the RAM 53 and the CPU 50 subsequently calculates therefrom the distance to the object.

Figure 5:
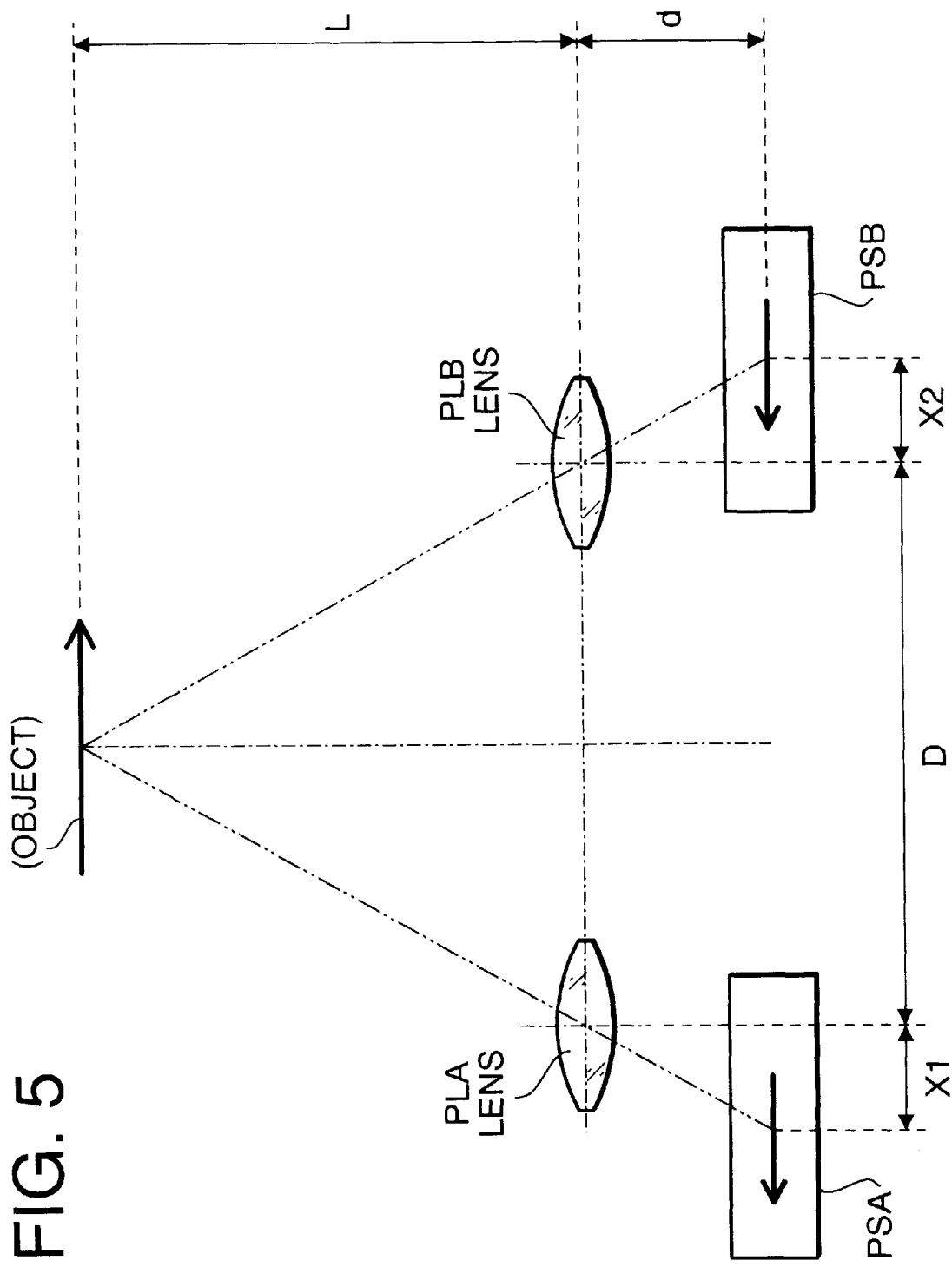
FIG. 5 is a schematic diagram explaining distance measurement for the camera of FIG. 1 operating using a passive method.

The operation of the distance measurement is the same as the conventional passive method, but will be briefly explained below. Referring to FIG. 5 a respective image of the object targeted for distance measurement is formed by the two passive lens PLA and PLB on the passive sensors PSA and PSB at both sides of the line sensor 30.

With the arrangement illustrated, the distance between the optical axes of the two passive lenses PLA and PLB is D, and the distance from both passive lenses PLA and PLB to each passive sensor PSA and PSB is d. The distances of the optical axis of each passive lens PLA and PLB from a particular point of each object image formed on each passive sensor PSA and PSB, for example, the horizontal center point, are x1 and x2 respectively while the distance from the object to the camera is L.

Then, according to trigonometry the following equation can be derived:

$$(L+d)/L=(D+x1+x2)/D \tag{1}$$

From this, the following equation can be derived:

$$L=(D \cdot d)/(x1+x2) \tag{2}$$

Figure 6A:
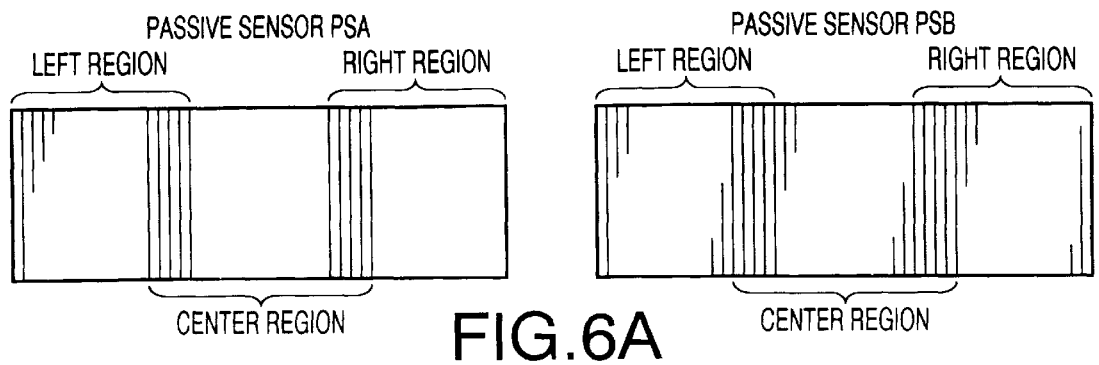
FIGS. 6A through 6C illustrate a method for detecting the image position of the spectral center in the passive method.

The passive method requires the detection of the parallax resulting from a difference in the position, on the passive sensors PSA and PSB, of the image from the same object. As shown in FIG. 6A, in this embodiment, each passive sensor PSA and PSB is divided, in the longitudinal direction of the line sensor 30, into three regions defined as the right region, center region, and left region, with their boundaries slightly overlapping.

Figure 6B:
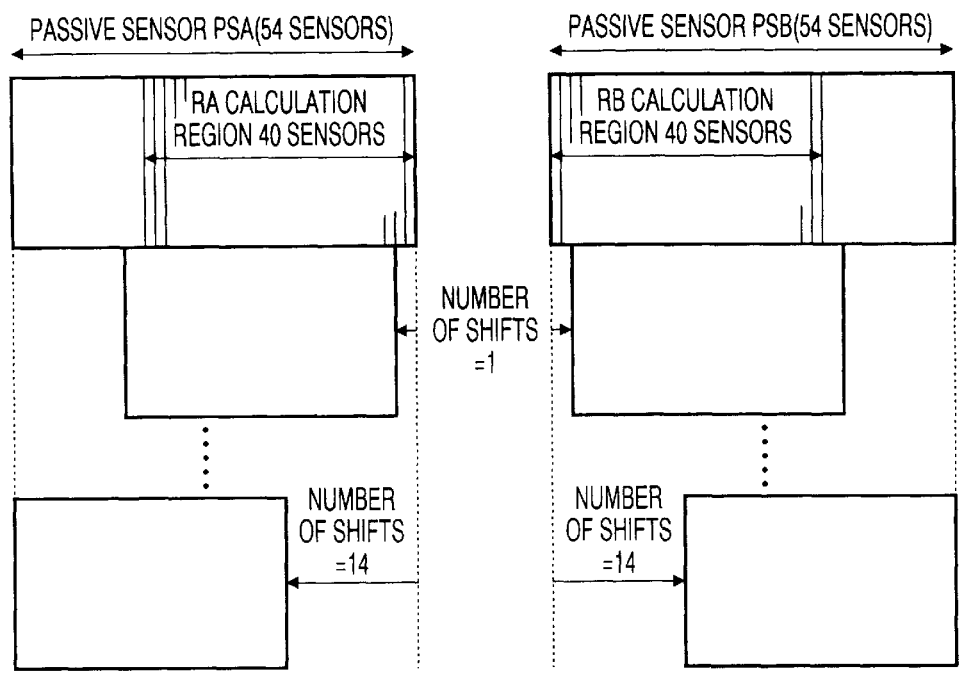

As shown in FIG. 6B, in the present embodiment, the right region, center region, and left region of each passive sensor PSA and PSB comprise fifty-four (54) elements respectively. For each region, a group of CCD elements in number equal to or greater than half the total number of elements in that region are selected as a calculation region RA and RB corresponding to sensors PSA and PSB respectively. In this embodiment, forty (40) elements are used for the calculation regions RA and RB. The calculation regions RA and RB are arranged at line symmetrical positions in the regions across both passive sensors PSA and PSB. Then, differences in the output for each element between both passive sensors are determined by shifting the elements of each calculation region one by one alternately between each passive sensor. The differences in output are also added over the calculation regions RA and RB. Consequently, in the present case, only fourteen (14) elements are shifted at each calculation region RA and RB, thereby providing twenty-nine (29) pieces of data including differences in output with non-shifted states added.

It will be appreciated that the number of elements in each region and in each calculation region can be varied.

Figure 6C:
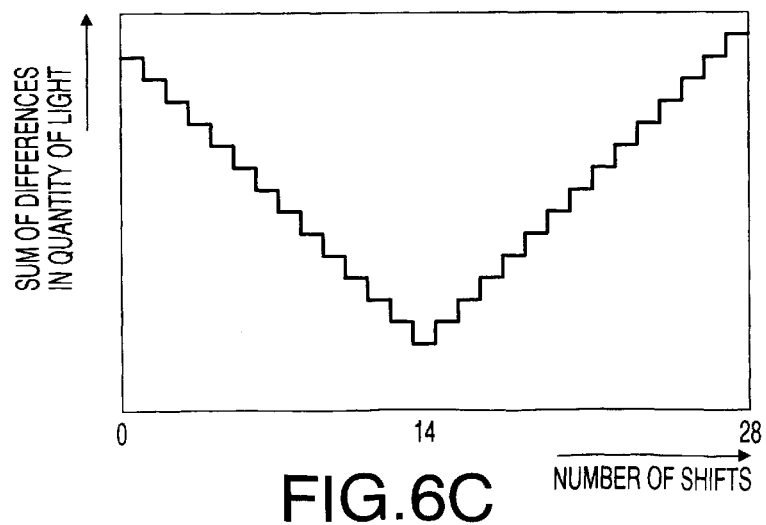

FIG. 6C show that the data results in a minimum value at a certain shift position, whereby the parallax (phase difference) can be determined. Therefore, the values of x1 and x2 in equations (1) and (2) can be obtained as a phase difference (x1+x2) so that the object distance L can be calculated.

The aforementioned calculation is performed for each of the three regions of each passive sensor.

Now, referring back to FIG. 4, the reliability of the data in the distance measuring calculation with the passive method, as described above, is judged in step S102. When it is determined that reliable data exists, the most reliable data is selected (S106) as distance measuring data to obtain a distance value (S107), and then the distance measurement is finished (S108). In the judgement of reliability, for example, the calculation can be performed for each of the divided three regions of each passive sensor PSA and PSB, respectively, with a plurality of calculations being performed for each region.

An average value and a variation for each distance measurement data are calculated from the plurality of distance measurement data thus obtained. Data which has an average value and variation value within a predetermined range of error is considered as reliable data. Then, one of the most reliable data is selected from the reliable data, and a distance measurement is calculated from that selected data.

If it is judged that no reliable data can be obtained in step S102, the CPU 50 executes the active method operation (S104).

Before performing the active method operation, it is determined whether the brightness of ambient light (Lv value) measured by a photometer (not shown) is equal to or greater than a certain level (S103).

With a value of Lv equal to or greater than a certain level, while the light emitted from the LED 40 will be reflected from an object with the active method, it will be difficult for the line sensor 30 receiving the reflected light to distinguish clearly the reflected light from the ambient light. This will cause the accuracy of the distance measurement to decrease so that reliable data can not be obtained. In this case, when the Lv value is equal to or greater than a certain level, the distance measurement value is set to a predetermined default value (S109). The default value is normally set to 2 to 3 m. This is based on the fact that pictures are often taken with an object being spaced 2 to 3 meters from a camera. Therefore, when the distance measuring data can not be considered as reliable, the default value is adopted which increases the probability of photo taking being in focus to a certain extent together with a suitable depth of field.

When the value Lv is below the certain level mentioned above, the active method mode is actuated (S104).

Figure 7:
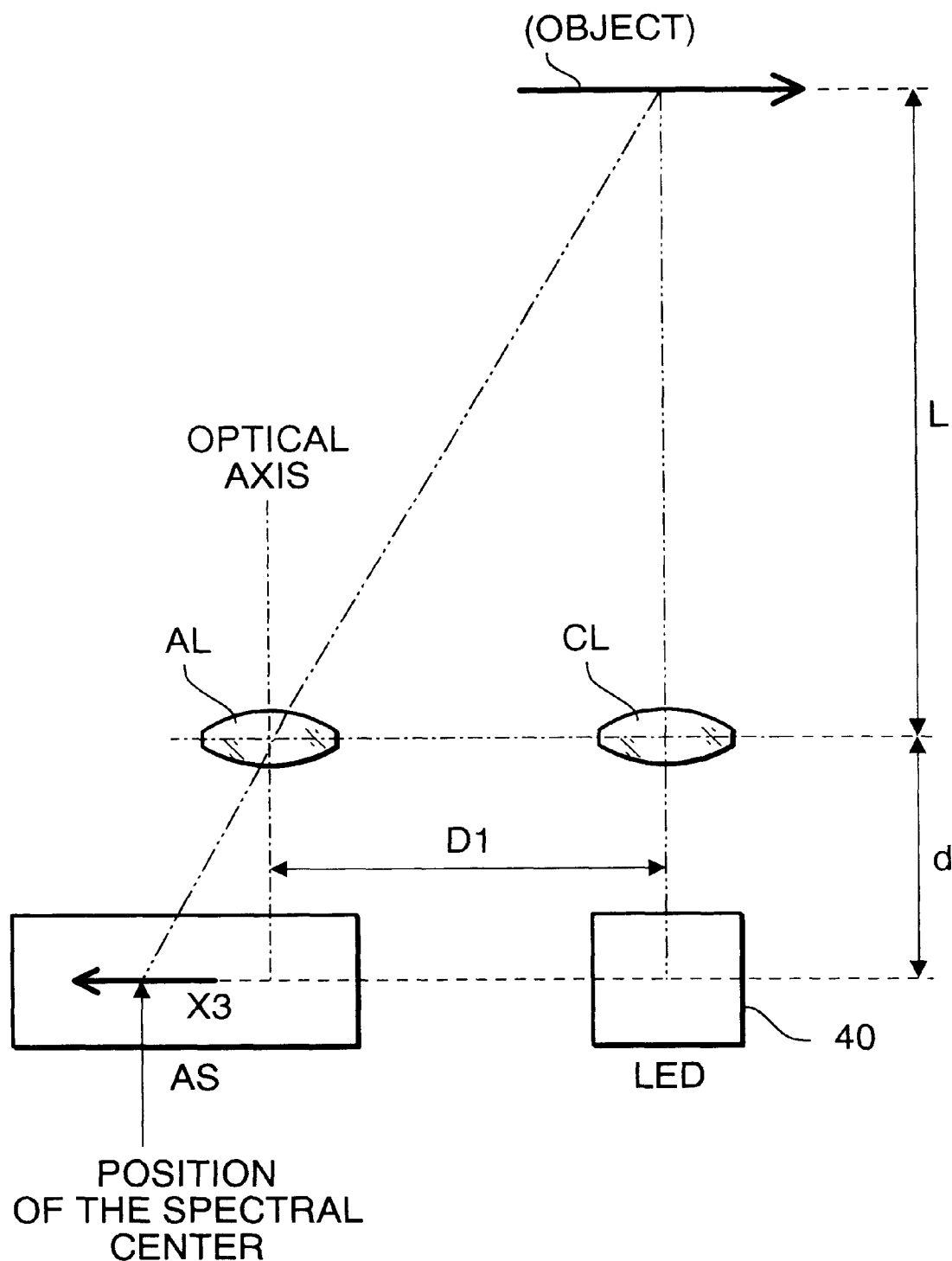
FIG. 7 is a schematic diagram explaining distance measurement for the camera of FIG. 1 operating using an active method.

The operation of the distance measurement for the active method will be explained below with reference to FIG. 7. The LED 40 emits infrared light towards an object. This light is reflected from the object in a diffuse manner and an image is formed on the active sensor AS by means of the active lens AL. The optical axis of the diffusely reflected light from the object can be prior detected to establish a center for the optical axis, and then the active sensor AS can detect the spectral center of the image of the object. In the present case, the spectral center is detected as the position of the CCD element having the highest light intensity value among the plurality of CCD elements constituting the active sensor AS.

If the distance from the object to the camera is L, the distance from the LED 40 to the optical axis of the active lens AL is D1, the distance between the active lens AL and the active sensor AS is d, and the distance from the spectral center of the detected object image to the active lens optical axis is x3, then, the following equation is derived:

$$(L+d)/L=(D1+x3)/D1 \tag{3}$$

From this, the following equation can be derived:

$$L=(D1 \cdot d)/x3 \tag{4}$$

It will be appreciated that when the position of the spectral center of the image has been determined, the detection accuracy of that center can be improved by determining the difference between the output provided by the active sensor AS at the time of the previous passive method operation and the output resulting from the light emitted by the LED 40 and reflected by the object. If the wavelength characteristics of the visible light cut-off filter 34 arranged in front of the active sensor AS are in fact very sharp so that the active sensor AS does not receive visible light used in the passive method operation, there is no advantage to determining the difference between the outputs.

When the active method operation (S104) is performed, it is preferable for the LED to emit light repeatedly to produce distance measuring data at each emission of light so that a plurality of distance measuring data are provided.

As shown in FIG. 4, it is determined whether reliable distance measuring data has been obtained from the plurality of data, for example, in a similar manner to that for the passive method operation (S105). When it is determined that reliable data exists, distance measuring data is selected (S106) and the selected data is used as a distance value (S107).

If no reliable distance measuring data is obtained, for example, in the case where the output of the LED 40 is too small or the object is located too far away to identify accurately the position of the spectral center of the image, the aforementioned default value is used as a distance value (S109).

When the passive method operation is performed, detection is carried out using ambient light, that is, visible light at the passive sensors PSA and PSB. In the present embodiment, the line sensor 30 is provided on the front surface thereof with the infrared light cut-off filter 33 so that the line sensor 30 is barely able to detect the infrared light included in natural light thus enabling an increase in the accuracy of the distance measurement.

As mentioned above, the distance measuring apparatus embodying the present invention enables distance measurement using the passive and active methods individually. The passive method is placed at a higher priority to obtain distance data, while the active method is performed to obtain distance data in the case where the brightness of ambient light is lower than a predetermined level when reliable distance data from the passive method is not available. This enables an increase in the probability of providing reliable distance data under various photo taking conditions.

Moreover, a line sensor employing CCD elements is used as the light receiving sensor for the passive method and active method respectively. Thus, using both PSD and CCD sensors is unnecessary thereby allowing for simplification of the configuration of the distance measuring apparatus resulting in miniaturization and decrease in the weight thereof.

With the described embodiment, although the passive sensor and active sensor are constituted by a single line sensor comprising a plurality of CCD elements, they may be constituted by individual independent arrays of CCD elements or CCD line sensors. Especially when such independent sensors are used, each passive sensor and the active sensor do not need to be arranged in a row as in the present embodiment and can be arranged in two rows.

Furthermore, when each sensor is independently constituted as in the foregoing, each sensor can have an independent or synchronized drive control. In addition, the passive lens, the active lens, and the condenser lens may be constituted independently of one another, and their arrangement may be appropriately determined corresponding to the arrangement of each sensor.

It will be appreciated that the distance measuring apparatus of the present invention may be applied to cameras employing silver film, as well as to various kinds of cameras such as digital cameras and video cameras. The combination of the distance measuring apparatus of the present invention with AF devices enables highly accurate AF photo taking.

As explained in the foregoing, the present invention provides a distance measuring apparatus having a passive method operation and an active method operation by using light receiving sensors comprising CCD elements. For this reason, unlike prior art distance measuring apparatus employing different methods, it is not necessary to have both PSD sensors as a light receiving sensor for the active method and CCD sensors as a light receiving sensor for the passive method. This enables the simplification of the configuration of the apparatus.

Furthermore, with the present invention, the passive method operation is placed at a higher priority to provide distance measuring data under normal conditions, and the active method operation is performed to provide distance measuring data under the condition when ambient light is less than a predetermined level when reliable distance measuring data is not available from the passive method so that it is possible to provide reliable distance measuring data under various photo-taking conditions.

The present disclosure relates to subject matter contained in Japanese Patent Application No. HEI 10-273771 filed on Sep. 28, 1998 and Japanese Patent Application No. HEI 11-160845 filed on Jun. 8, 1999, which are expressly incorporated herein by reference in their entirety.

What is claimed is:

1. A distance measuring apparatus for measuring the distance to an object, the apparatus including:
   at least three sensors respectively comprising a plurality of CCD elements, each of said CCD elements being positioned on a single straight line;
   an optical system that forms an image of said object on said sensors;
   a light emitting element that radiates light to said object; and
   a system that operates at least two of said sensors as passive sensors for passive sensing, and that operates at least one of said sensors as an active sensor in combination with the light emitting element for active sensing,
   said optical system comprising passive lenses that form an image of said object onto said passive sensors, an active lens that forms an image of an object corresponding to said active sensor, and a condenser lens that condenses light which said light-emitting element emits and is directed to the object, said active lens, said condenser lens and said passive lenses being formed as a single unit.

2. Apparatus according to claim 1, wherein said at least three sensors have a light receiving surface thereof provided with an infrared light filter, and a light receiving surface of said sensor operated as an active sensor is provided with a visible light filter; and
   wherein said light-emitting element emits light in a region of wavelengths between a visible light region and an infrared light region.

3. Apparatus according to claim 1, wherein said active sensor is located at a central portion of said straight line with said passive sensors located at both ends of said straight line.

4. Apparatus according to claim 1, wherein each of said passive and active sensors is controllable to be driven independently of or in synchronization with one another.

5. Apparatus according to claim 1,
   wherein corresponding CCD elements of said two passive sensors are mutually compared when light from the object is incident thereon;
   wherein a particular point of animage of the object is detected at said at least two passive sensors in accordance with a difference which results from said comparison; and wherein the distance to the object is calculated in accordance with the difference in said particular points at said passive sensors.

6. Apparatus according to claim 1, wherein said active sensor is located to receive light emitted by said light emitting element and reflected by the object;

wherein CCD elements of the active sensor are compared to detect a CCD element corresponding to the spectral center of a received image of the object;

wherein the spectral center of the received image at said active sensor is determined in accordance with the CCD element detected; and wherein the distance to the object is calculated in accordance with the determined position of the center of gravity.

7. Apparatus according to claim 6, wherein said active sensor is provided to enable a difference to be determined between a light receiving output therefrom during passive sensing and a light receiving output therefrom during active sensing; and wherein the spectral center of the received image at said active sensor is determined assuming that said difference is caused by the light which is emitted by said light emitting element and then reflected by the object.

8. Apparatus according to claim 1, comprising a control circuit for operating said passive sensors during passive sensing and said active sensor during active sensing; wherein said passive sensing is performed initially.

9. Apparatus according to claim 8, wherein said active sensing is conducted when reliable distance measuring data is not obtained when said passive sensing is performed.

10. Apparatus according to claim 9, wherein said control circuit detects the ambient brightness level and said active sensing is performed when said detected level is equal to or less than a predetermined level.

11. The apparatus according to claim 1, said light emitting element being positioned on said straight line.

12. A distance measuring apparatus that measures distance to an object, the apparatus comprising:

a single line sensor having a light receiving portion comprising a plurality of CCD elements positioned on a straight line, said light receiving portion being divided into at least three regions which do not overlap one another, said at least three regions defining at least three sensors;

a light emitting element that radiates light onto the object;

an optical system that forms an image of an object on said sensors, said optical system comprising passive lenses that form an image of said object onto said passive sensors, an active lens that forms an image of an object corresponding to said active sensor, and a condenser lens that condenses light which said light emitting element emits and is directed to the object, said lenses being formed as a single lens unit; and an operation system that operates at least two of said sensors as passive sensors to perform a passive sensing operation and that operates at least one of said sensors as an active sensor in combination with the light emitting element to perform an active sensing operation.

13. The apparatus according to claim 12, said light emitting element being positioned on said straight line.

14. The apparatus according to claim 12, wherein each of said passive and active sensors is controllable to be driven one of independently of and in synchronization with one another.

15. The apparatus according to claim 12, wherein said active sensor is positioned at a central portion of said light receiving portion with said passive sensors located at each end of said light receiving portion.

16. The apparatus according to claim 12, further comprising a control system that operates said passive sensors during a passive sensing operation and said active sensor during an active sensing operation, said passive sensing operation being performed prior to said active sensing operation.

17. The apparatus according to claim 16, wherein said control system is configured to perform said active sensing operation when reliable distance measurement data is not obtained during a performance of said passive sensing operation.

18. The apparatus according to claim 16, wherein said control system detects an ambient brightness level, and said active sensing operation is performed when said detected ambient brightness level is equal to or less than a predetermined level.

* * * * *